(12) United States Patent
Knaupp et al.

(10) Patent No.: US 8,401,692 B2
(45) Date of Patent: Mar. 19, 2013

(54) SYSTEM AND METHOD FOR TOOL TESTING AND ALIGNMENT

(75) Inventors: Michael Knaupp, Zaisenhausen (DE); Andreas Meyer, Neibsheim (DE)

(73) Assignee: Flow International Corporation, Kent, WA (US)

( * ) Notice: Subject to any disclaimer, the term of this patent is extended or adjusted under 35 U.S.C. 154(b) by 268 days.

(21) Appl. No.: 12/878,885

(22) Filed: Sep. 9, 2010

(65) Prior Publication Data
US 2012/0065769 A1 Mar. 15, 2012

(51) Int. Cl.
*G06F 19/00* (2011.01)

(52) U.S. Cl. .......... 700/193; 700/160; 451/38; 451/99; 83/53; 83/177

(58) Field of Classification Search .......... 700/193, 700/160; 451/38, 99; 83/177, 53
See application file for complete search history.

(56) References Cited

U.S. PATENT DOCUMENTS

| | | | | |
|---|---|---|---|---|
| 4,786,848 A * | 11/1988 | Nickerson | ............ | 318/577 |
| 4,798,469 A | 1/1989 | Burke | ............ | 356/376 |
| 5,297,238 A | 3/1994 | Wang et al. | ............ | 395/94 |
| 5,457,367 A | 10/1995 | Thorne | ............ | 318/568.11 |
| 5,536,916 A | 7/1996 | Kohari et al. | ............ | 219/121.83 |
| 5,643,058 A | 7/1997 | Erichsen et al. | ............ | 451/99 |
| 5,883,390 A | 3/1999 | Pryor et al. | ............ | 250/559.31 |
| 6,044,308 A | 3/2000 | Huissoon | ............ | 700/166 |
| 6,628,322 B1 | 9/2003 | Cerruti | ............ | 348/141 |
| 6,681,145 B1 | 1/2004 | Greenwood et al. | ............ | 700/193 |
| 6,775,013 B2 | 8/2004 | Wang | ............ | 356/614 |
| 6,996,452 B2 * | 2/2006 | Erichsen et al. | ............ | 700/160 |
| 7,173,691 B2 | 2/2007 | Murphy et al. | ............ | 356/138 |
| 7,385,671 B2 | 6/2008 | Gardner et al. | ............ | 355/53 |
| 2004/0107810 A1 * | 6/2004 | Sciulli et al. | ............ | 83/177 |
| 2004/0259478 A1 | 12/2004 | Hashish et al. | ............ | 451/38 |
| 2009/0084235 A1 | 4/2009 | Kata et al. | ............ | 83/72 |
| 2009/0118864 A1 | 5/2009 | Eldridge et al. | ............ | 700/259 |

FOREIGN PATENT DOCUMENTS

| | | |
|---|---|---|
| WO | 93/05479 A1 | 3/1993 |
| WO | 98/57782 A1 | 12/1998 |
| WO | 00/35639 A1 | 6/2000 |
| WO | 2008/128303 A1 | 10/2008 |

\* cited by examiner

*Primary Examiner* — Tejal Gami
(74) *Attorney, Agent, or Firm* — Seed IP Law Group PLLC (57) ABSTRACT

A system and method for improving a tool tip path of a machine, such as a waterjet cutting machine, by testing and compensating for tool misalignment. The system and method using a sensor positioned to sense a portion of the machine, such as a cutting head assembly, during a sequence of movements thereof and configured to output information indicative of various positions and orientations of a tool of the machine so as to generate an improved tool tip path based on transformation parameters derived from such information.

19 Claims, 8 Drawing Sheets

SYSTEM AND METHOD FOR TOOL TESTING AND ALIGNMENT

BACKGROUND

1. Technical Field

This disclosure relates to a system and method for improving a tool tip path of a multi-axis machine by testing and compensating for tool misalignment, and in some embodiments, is directed to a system and method for improving a tool tip path of a waterjet cutting machine by testing and compensating for tool misalignment.

2. Description of the Related Art

High-pressure fluid jets, including high-pressure abrasive waterjets, are used to cut a wide variety of materials in many different industries. Abrasive waterjets have proven to be especially useful in cutting difficult, thick, or aggregate materials, such as thick metal, glass, or ceramic materials. Systems for generating high-pressure abrasive waterjets are currently available, such as, for example, the Mach 4™ 5-axis abrasive waterjet system manufactured by Flow International Corporation, the assignee of the present invention, as well as other systems that include an abrasive waterjet cutting head assembly mounted to an articulated robotic arm. Other examples of abrasive waterjet cutting systems are shown and described in Flow's U.S. Pat. No. 5,643,058, which is incorporated herein by reference. The terms "high-pressure fluid jet" and "jet" should be understood to incorporate all types of high-pressure fluid jets, including but not limited to, high-pressure waterjets and high-pressure abrasive waterjets. In such systems, high-pressure fluid, typically water, flows through an orifice in a cutting head to form a high-pressure jet, into which abrasive particles are combined as the jet flows through a mixing tube. The high-pressure abrasive waterjet is discharged from the mixing tube and directed toward a workpiece to cut the workpiece along a designated path.

Various systems are currently available to move a high-pressure fluid jet along a designated path. Such systems may commonly be referred to, for example, as three-axis and five-axis machines. Conventional three-axis machines mount the cutting head assembly in such a way that it can move along an x-y plane and perpendicular along a z-axis, namely toward and away from the workpiece. In this manner, the high-pressure fluid jet generated by the cutting head assembly is moved along the designated path in an x-y plane, and is raised and lowered relative to the workpiece, as may be desired. Conventional five-axis machines work in a similar manner but provide for movement about two additional non-parallel rotary axes. Other systems may include a cutting head assembly mounted to an articulated robotic arm, such as, for example, a 6-axis robotic arm which articulates about six separate rotary axes.

Computer-aided manufacturing (CAM) processes may be used to efficiently drive or control such conventional machines along a designated path, such as by enabling two-dimensional or three-dimensional models of workpieces generated using computer-aided design (i.e., CAD models) to be used to generate code to drive the machines. For example, a CAD model may be used to generate instructions to drive the appropriate controls and motors of the machine to manipulate the machine about its translational and/or rotary axes to cut or process a workpiece as reflected in the model.

Manipulating a waterjet about five or six axes may be particularly useful for a variety of reasons, for example, to cut a three-dimensional shape. To facilitate accurate machining of complex parts using a 5-axis or 6-axis machine it may be advantageous to know the precise spatial relationship between a tool of the machine and an expected tool location defined by the design of the machine, and make adjustments for the same. The expected tool location may be dependent on a number of factors, including machine configuration. For example, in a 5-axis waterjet cutting machine having three translational axes and two non-parallel rotary axes that converge to form a machine focal point, the expected tool location may be located in line with or a selected offset distance from the machine focal point. In other machines, an expected tool location may be positioned relative to a tool reference frame of a terminal component or link of the machine.

In some instances, it is beneficial to align a tool of a machine with the machine's focal point. To set up or test whether a tool of the machine is aligned with the focal point or within a generally accepted tolerance range, it is known to perform manual measurements and physically adjust the alignment of the system based on such measurements, for example, as described below.

Figure 1:
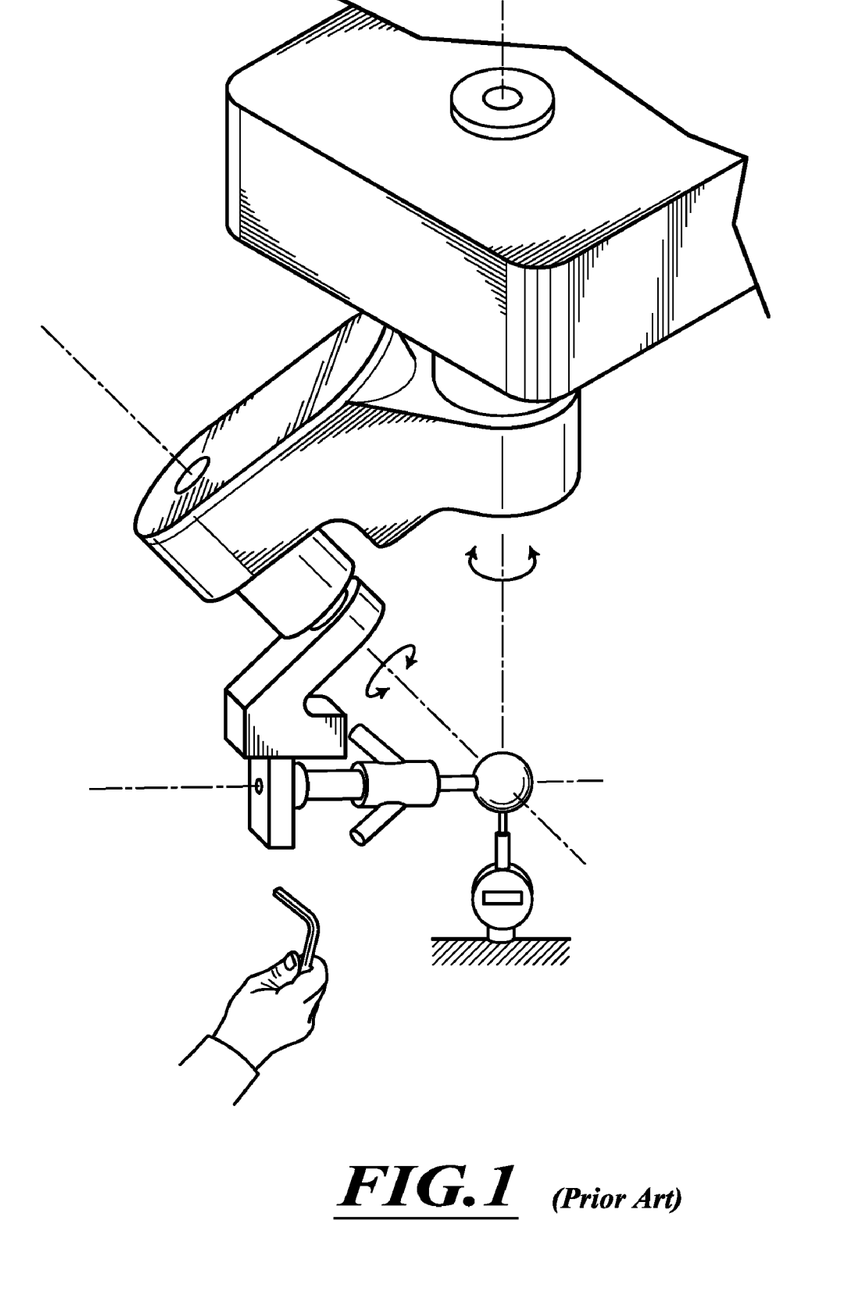
FIG. 1 is an isometric view of a 5-axis waterjet cutting machine having a testing probe installed illustrating a portion of a conventional manual focal point testing and tool alignment procedure.

A portion of a manual focal point testing and tool alignment apparatus and process is illustrated in FIG. 1, which shows a 5-axis abrasive waterjet machine loaded with a spherical probe at the working end of the machine. A dial indicator is used adjacent the spherical probe to measure the change in position of the surface of the probe as the machine is instructed to move through various orientations, such as, for example, as a wrist of the machine is rotated about a primary rotary axis. Based on the measurements obtained, a technician then physically adjusts the location of the probe by loosening appropriate bolts, adjusting the assembly holding the probe and retightening the bolts to compensate for the perceived misalignment. This process is repeated with the dial gage posed in different locations and orientations to capture adjustments that may be needed due to misalignment between the probe and the machine focal point. This process requires iterative measurements and adjustments as the physical adjustment of the probe with respect to one axis of rotation or translation can cause misalignment with respect to the other axes of rotation or translation. The manual testing and alignment process generally requires a skilled technician. The process is also prone to errors and can be extremely laborious and time-consuming resulting in extended periods of machine downtime. Still further, because the process requires the replacement of a probe with a cutting head or other tool it is prone to the introduction of misalignment at the time the probe is exchanged with the cutting head or other tool prior to processing a workpiece.

BRIEF SUMMARY

Embodiments described herein provide enhanced systems and methods for improving a tool tip path (i.e. the path along and orientation in which a tip of the tool moves and is directed during operation) of a waterjet cutting machine or the like by testing and compensating for tool misalignment.

For example, one embodiment of a method for improving a tool tip path of a waterjet cutting machine may be summarized as including sequencing a cutting head assembly coupled to the waterjet cutting machine through a first sequence of positions and orientations relative to a base reference frame; receiving information indicative of the position and orientation of a sensor with respect to the base reference frame; sequencing a cutting head assembly coupled to the waterjet cutting machine through a second sequence of positions and orientations relative to the position and orientation of the sensor; sensing a location of the cutting head assembly at each position and orientation of the second sequence of positions and orientations with the sensor to obtain information indicative of the second sequence of positions and orientations; and generating an improved tool tip path based at least in part on transformation parameters calculated from the information indicative of second sequence of positions and orientations. Sensing a location of the cutting head assembly at each position and orientation of the second sequence of positions and orientations with a sensor may include sensing a portion of the cutting head assembly, such as a mixing tube, the waterjet itself, or a pin or other structure coupled to the cutting head assembly. Sensing a location of the cutting head assembly at each position and orientation of the second sequence of positions and orientations with a sensor may also include interrupting a light beam of a photoelectric sensor.

A method for improving a tool tip path of a waterjet cutting machine, according to another embodiment, may be summarized as including, under the control of one or more configured computing systems, providing instructions to move a cutting head assembly coupled to the waterjet cutting machine through a first plurality of positions and orientations; calculating a reference frame of a sensor, such as, for example, a photoelectric sensor, based at least in part on information indicative of the first plurality of positions and orientations; providing instructions to move a cutting head assembly coupled to the waterjet cutting machine through a second plurality of positions and orientations relative to the reference frame of the sensor; receiving information indicative of the second plurality of positions and orientations of a portion of the cutting head assembly from the sensor, the sensor configured to sense the portion of the cutting head assembly as the cutting head assembly moves through the second plurality of positions and orientations proximate the sensor; and providing instructions to move a tool center point of the cutting head assembly along an improved tool tip path derived at least in part from the information indicative of the second plurality of positions and orientations of the portion of the cutting head assembly. Receiving information indicative of the second plurality of positions and orientations of a portion of the cutting head assembly may include receiving information indicative of the second plurality of positions and orientations of a mixing tube of the cutting head assembly. Providing instructions to move the cutting head assembly through a first plurality of positions and orientations may include providing instructions to move the cutting head assembly in a series of movements with the cutting head assembly in a vertical orientation with respect to a base reference frame to trigger the sensor in at least two positions and providing instructions to move the cutting head assembly in a series of movements with the cutting head assembly in a horizontal orientation with respect to the base reference frame to trigger the sensor in at least two other positions. Providing instructions to move a cutting head assembly coupled to the waterjet cutting machine through a second plurality of positions and orientations relative to the reference frame of the sensor may include providing instructions to move the cutting head assembly through the second plurality of positions and orientations perpendicularly with respect to the reference frame of the sensor.

The method may further include calculating transformation parameters based at least in part on the information indicative of the second plurality of positions and orientations of the portion of the cutting head assembly, and wherein the improved tool tip path is derived at least in part from the transformation parameters. The transformation parameters may be indicative of at least a misalignment of a machine focal point and a tool center line of the cutting head assembly.

According to yet another embodiment, a method for improving a tool tip path of a multi-axis machine, such as, for example, a 5-axis waterjet cutting machine, may be summarized as including, under the control of one or more configured computing systems, providing instructions to move a tool coupled to the multi-axis machine through a first set of positions and orientations proximate a sensor; receiving information indicative of the position and orientation of the sensor as the tool moves through the first set of positions and orientations to determine a sensor reference frame; providing instructions to move the tool through a second set of positions and orientations proximate the sensor and relative to the sensor reference frame; receiving information indicative of the second set of positions and orientations of the tool from the sensor; calculating transformation parameters based at least in part on the information indicative of the second set of positions and orientations of the tool; and providing instructions to move the tool along an improved tool tip path derived at least in part from the transformation parameters. Providing instructions to move the tool through a first set of positions and orientations may include providing instructions to move the tool in a series of movements with the tool in a vertical orientation with respect to a base reference frame to trigger the sensor in at least two positions of the first set of positions and orientations and providing instructions to move the tool in a series of movements with the tool in a horizontal orientation with respect to the base reference frame to trigger the sensor in at least two other positions of the first set of positions and orientations. Calculating transformation parameters based at least in part on the information indicative of the second set of positions and orientations of the tool may include calculating transformation parameters which compensate for at least a misalignment between a tool vector passing through the machine focal point and a tool center line of the tool.

DETAILED DESCRIPTION

In the following description, certain specific details are set forth in order to provide a thorough understanding of various disclosed embodiments. However, one skilled in the relevant art will recognize that embodiments may be practiced without one or more of these specific details. In other instances, well-known structures and control techniques associated with waterjet cutting machines or other multi-axis machines may not be shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Embodiments of the methods and systems described herein improve a tool tip path of a multi-axis machine, such as a 5-axis or 6-axis waterjet cutting machine, by testing and compensating for tool misalignment. Example embodiments include a control system to calculate tool offset values and derive transformation parameters based on position and orientation information of a cutting head assembly obtained from manipulating the cutting head assembly through the beam of a photoelectric sensor. The control system may further control the orientation of the waterjet relative to a workpiece being processed based on a kinematic setup derived in part from the tool offset values or transformation parameters.

The capabilities of the control system allow operators to measure and compensate for tool misalignment without physical adjustment of machine components relative to each other. The automation capability of the control system thus minimizes or eliminates downtime that would otherwise be required to manually test and make physical adjustments to the machine. In addition, the tool misalignment compensation capability of the control system results in increased accuracy of the machine by improving a tool tip path of the same (i.e. the path along and orientation in which a tip of a tool of the machine moves and is directed during operation).

Although discussed herein in terms of waterjets, and abrasive waterjets in particular, one skilled in the art will recognize that the techniques of the present invention can be applied to any type of fluid jet, generated by high pressure or low pressure, whether or not additives or abrasives are used. In addition, one skilled in the art will recognize that these techniques can be modified to control and compensate for misalignments of components of various other types of multi-axis machines, such as, for example, multi-axis CNC milling machines.

Figure 2:
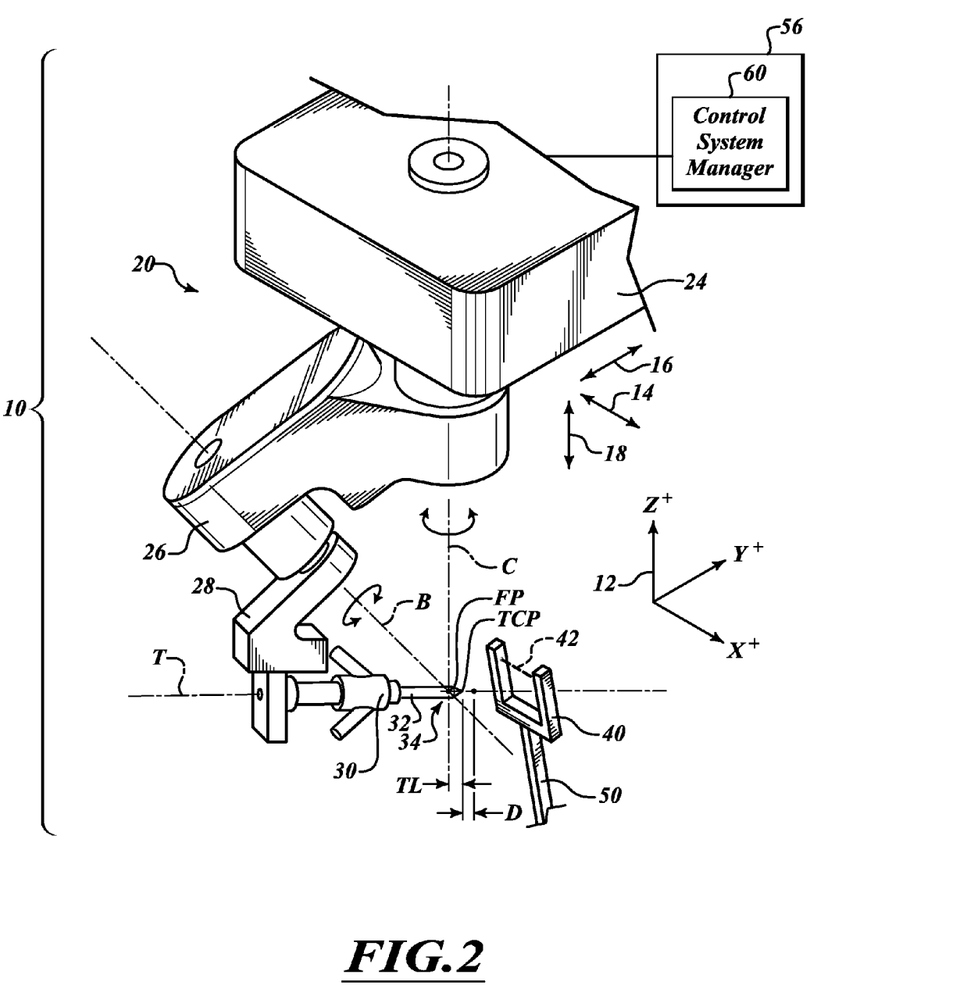
FIG. 2 is an isometric view of a system for improving a tool tip path of a waterjet cutting machine including a 5-axis waterjet cutting machine and a sensor.

FIG. 2 shows a system 10 for improving a tool tip path of a waterjet cutting machine 20, according to one embodiment. The waterjet cutting machine 20 includes a cutting head assembly 30 movable via three linear axes indicated by the arrows labeled 14, 16, 18 and two rotary axes B, C. More particularly, a base 24 of the machine 20 is configured to translate side to side parallel to an x-axis X, fore and aft parallel to a y-axis Y, and up and down parallel to a z-axis Z, wherein each axis is defined by a base reference frame 12 which defines a global Cartesian coordinate system for the machine 20. The base 24 is rotatably coupled to a forearm structure 26 which in turn is rotatably coupled to a wrist 28 to support the cutting head assembly 30. The wrist 28 and hence cutting head assembly 30 rotate about a first rotary axis B and the forearm 26 rotates about a second rotary axis C. In an ideal system configuration, the first rotary axis B and the second rotary axis C intersect to define a focal point FP.

To ensure accurate machining of a workpiece, it is desirable to precisely determine the spatial relationship between a tool and the expected position of the tool set by design (e.g., the variation of the tool from an ideal operating position). This may include, for example, determining the spatial relationship between a tool and another reference point or feature of the machine. For example, in some types of machines it may be advantageous to precisely determine the special relationship between a tool center point TCP and a machine focal point FP. For some waterjet cutting machines, such as the waterjet cutting machine 20 shown in FIG. 2, the tool center point TCP can be defined as a point that lies on a center line T of the cutting head assembly 30 at an end thereof 34 or at a defined standoff distance D (e.g., 3 mm) from the end of the cutting head assembly 30. As used herein, the tool center point TCP refers to a point at the end 34 of a mixing tube 32 of the cutting head assembly 30. The distance from the tool center point TCP to the machine focal point FP in a direction defined by the center line T of the cutting head assembly 30 defines a tool length or tool length offset TL. Although the initial position of the tool center point TCP can be estimated by design, manufacturing and assembly constraints cause the tool center point TCP to vary from an ideal position leading to misalignment in the expected spatial relationship between the machine focal point FP and expected tool center point TCP. Misalignment may also be expressed in terms of a misalignment between a tool vector passing through the machine focal point FP and a tool center line T passing through the tool center point TCP. Although this misalignment may be slight in some instances and more substantial in others, it is nevertheless advantageous in either case to adjust or otherwise compensate for this misalignment to enhance the accuracy of processed workpieces. Various systems and methods described herein provide for improving a tool tip path of a waterjet cutting machine 20 by testing and compensating for tool misalignment, including, for example, focal point FP and tool center point TCP misalignment in 5-axis waterjet cutting machines.

According to one embodiment, the system 10 includes a sensor 40 that enables the system 10 to test and compensate for focal point FP and tool center point TCP misalignment in a non-contact manner with the machine 20 in an unmodified, ready-to-use state. The example sensor 40 shown in FIG. 2 is a high-precision fork type photoelectric sensor having a light beam 42 extending between opposing arms thereof, such as, for example, the GL series fork type light beam switch available from Pepperl+Fuchs. Although the sensor 40 is shown as a fork type photoelectric sensor, it is appreciated that in other embodiments other sensors may be used, such as, for example, inductive, capacitive or other proximity sensors. In some embodiments, various contact sensors may be used, such as, for example, a whisker sensor or switch. The various sensors may be triggered (i.e., activated, tripped, engaged, etc.) by a portion of the machine 20 in various positions and/or orientations to generate signals indicative of the same. In some embodiments, a pin or other structure may be attached or coupled to the cutting head assembly 30 for triggering the sensor 40. For example, a cylindrical pin (not shown) may be inserted and retained in the bore of a mixing tube 32 of the cutting head assembly 30 such that the pin may be used to trigger the sensor 40 when manipulating the cutting head assembly 30 through various positions and orientations.

The sensor 40 of the embodiment illustrated in FIG. 2 is secured via a support or fixture 50 within the operable range of the waterjet cutting machine 20. The exact position and orientation of the light beam 42 is not critical to the systems and methods described herein as the position and orientation of the light beam 42 can be determined to a high degree of accuracy with movements of the waterjet cutting machine 20 as described in further detail below. The sensor 40 is instead generally positioned to sense a portion of the cutting head assembly 30, a waterjet of the same or a structure coupled to the cutting head assembly 30 during a sequence of movements of the cutting head assembly 30 and configured to output information indicative of the positions and/or orientations thereof. For example, in the example system 10 illustrated in FIG. 2, the sensor 40 is fixed relative to the base reference frame 12 and aligned such that the light beam 42 is approximately parallel to the y-axis Y of the base reference frame 12. The light beam 42 is configured such that the light beam 42 may be interrupted by a mixing tube 32 of the cutting head assembly 30 as the cutting head assembly 30 is manipulated in space.

FIG. 2 further shows a controller 56 communicatively coupled to the waterjet cutting machine 20 to control the movement of a cutting head assembly 30 with respect to three translation axes indicated by arrows 14, 16 and 18 and the two rotary axes B, C. The controller 56 may generally include, without limitation, one or more computing devices, such as processors, microprocessors, digital signal processors (DSP), application-specific integrated circuits (ASIC), and the like. To store information, the controller 56 may also include one or more storage devices, such as volatile memory, non-volatile memory, read-only memory (ROM), random access memory (RAM), and the like. The storage devices can be coupled to the computing devices by one or more buses. The controller 56 may further include one or more input devices (e.g., displays, keyboards, touchpads, controller modules, or any other peripheral devices for user input) and output devices (e.g., displays screens, light indicators, and the like). The controller 56 can store one or more programs for processing any number of different workpieces according to compensated tool tip paths. For example, the controller 56 is shown storing a control system manager 60 module that is used to perform tool testing and alignment. The controller 56 can also control operation of other components, such as fluid and abrasive delivery to the waterjet cutting machine 20.

Figure 3:
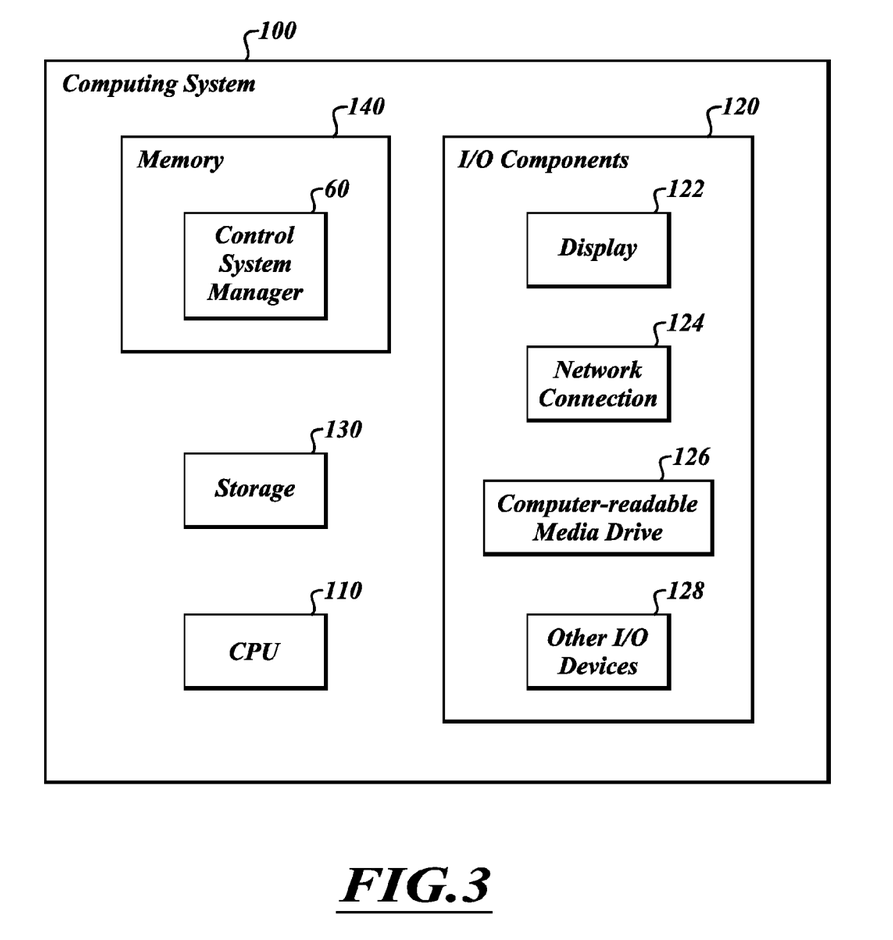
FIG. 3 is a block diagram illustrating an example controller suitable for executing a control system manager for improving a tool tip path of a waterjet cutting machine, according to one embodiment.

FIG. 3 is a block diagram of a controller 56, according to one embodiment, in the form of a general purpose computer system 100 for practicing embodiments of the control system manager 60 described herein. In the illustrated embodiment, the computing system 100 has components that include a CPU 110, various I/O components 120, storage 130, and memory 140. The illustrated I/O components include a display 122, a network connection 124, a computer-readable media drive 126, and other I/O devices 128 (a keyboard, a mouse, speakers, etc.). An embodiment of the control system manager 60 is executing in memory 340, such as under control of configured CPU 110, and includes functionality related to improving a tool tip path of a waterjet cutting machine 20 by testing and compensating for tool misalignment as described in more detail elsewhere.

It will be appreciated that computing system 100 is merely illustrative of one embodiment of a controller 56 and is not intended to limit the scope of the present invention. The computing system 100 may instead include multiple interacting computing systems or devices, and the computing system 100 may be connected to other devices that are not illustrated, including through one or more networks, such as the Internet. More generally, a computing device or other computing system may comprise any combination of hardware or software that may interact and perform the described types of functionality, including without limitation, desktop or other computers, database servers, network storage devices and other network devices. In addition, the functionality provided by the control system manager 60 may in some embodiments be distributed in various software modules. Similarly, in some embodiments some of the functionality of the control system manager 60 may not be provided and/or other additional functionality may be available.

It will also be appreciated that, while the control system manager 60 is described as being stored in memory while being used, the control system manager 60 and/or portions or modules thereof may be transferred between memory and other storage devices for purposes of memory management and data integrity. Alternatively, in other embodiments some or all of the software modules and/or systems may execute in memory on another device and communicate with the illustrated computing system 100 via inter-computer communication. Furthermore, in some embodiments, some or all of the systems and/or modules may be implemented or provided in other manners, such as at least partially in firmware and/or hardware. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present invention may be practiced with other computer system configurations.

Figure 4:
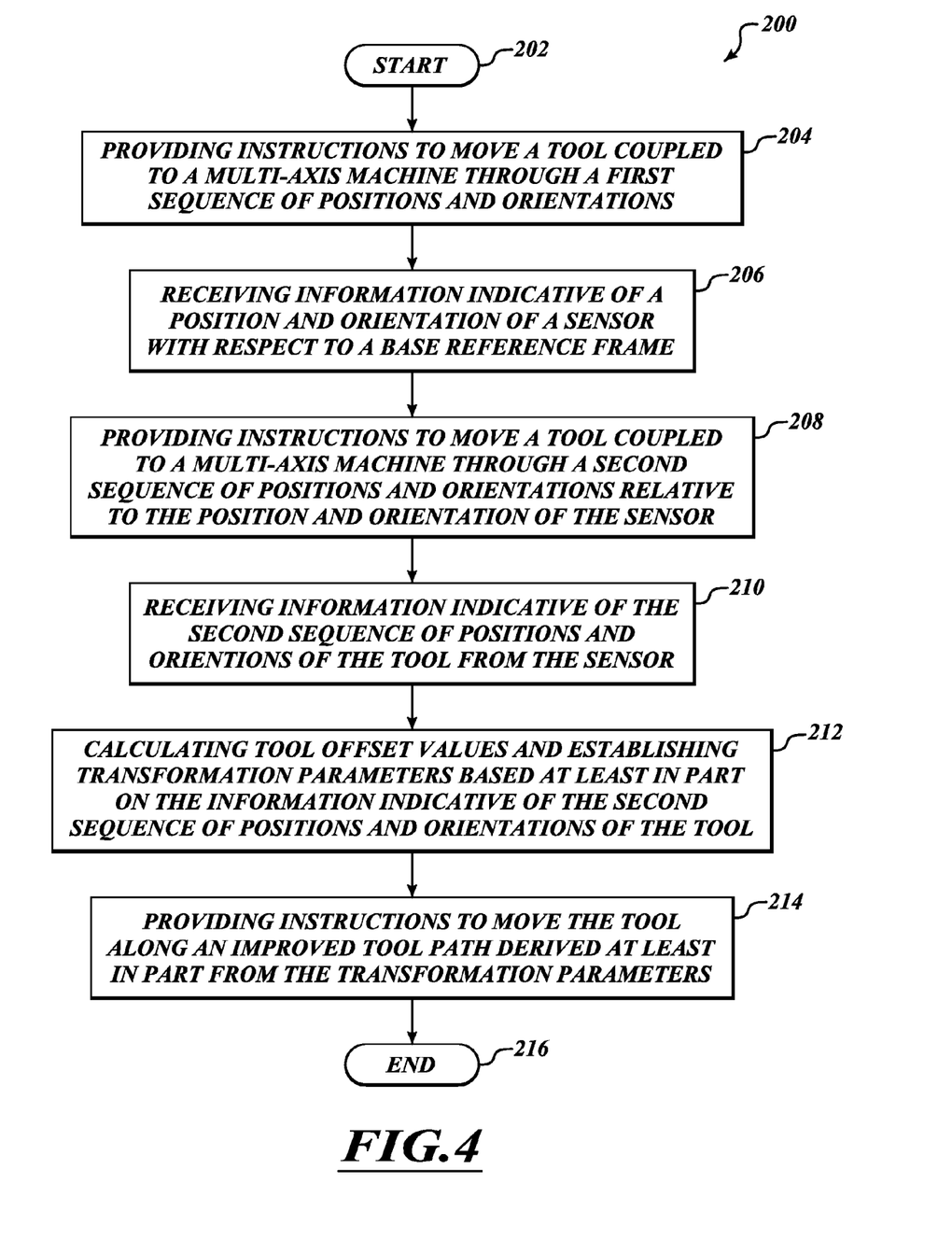
FIG. 4 is a flow diagram showing a method for improving a tool tip path of a waterjet cutting machine, according to one embodiment.

FIG. 4 is an example flow diagram of a method 200 executed by an example embodiment of a control system manager 60 to improve a tool tip path of a waterjet cutting machine 20 by testing and compensating for tool misalignment.

The method starts at 202, such as in response to an indication to perform a tool testing and alignment procedure.

At 204, the control system manager 60 provides instructions to move a tool coupled to a multi-axis machine through a first sequence of positions and orientations. For example, according to one embodiment, the cutting head assembly 30 of the waterjet cutting machine 20 is instructed to cycle through at least some of the various positions and orientations illustrated in FIGS. 5 and 6, as described in more detail further below.

At 206, the control system manager 60 receives information indicative of the position and orientation of the sensor 40 with respect to a base reference frame 12, and thereafter calculates a sensor reference frame 48.

At 208, the control system manager 60 provides instructions to move the tool through a second sequence of positions and orientations relative to the sensor reference frame 48. For example, according to one embodiment, the cutting head assembly 30 of the waterjet cutting machine 20 is instructed to cycle through at least some of the various positions and orientations illustrated in FIGS. 7-10, as described in more detail further below.

At 210, the control system manager 60 receives information indicative of the second sequence of positions and orientations, and at 212, calculates tool offset values and derives transformation parameters based at least in part on the information indicative of the second sequence of positions and orientations of the tool. These offset values and/or transformation parameters may be stored for subsequent use during operation of the machine to process a workpiece.

For example, at 214, the control system manager 60 may provide instructions to move the tool along an improved tool tip path derived at least in part from the transformation parameters.

The method 200 terminates at 216. The method may terminate for example, upon providing the instructions to move the tool along the improved tool tip path. Alternatively, the method 200 may repeat by returning to step 204 prior to providing instructions at 214. In other embodiments, the method 200 may repeat after a workpiece is done being processed and while another workpiece is being loaded or prepared for processing.

In some embodiments, the method 200 may further include a verification procedure wherein, after calculating the tool offset values and transformation parameters, the control system manager 60 applies the tool offset values or transformation parameters to modify the kinematic setup of the machine and test whether the tool testing and alignment procedure has brought the accuracy of the machine into an acceptable tolerance range. For example, with the newly defined kinematic setup, the method 200 may repeat to obtain new tool offset values, and ultimately new transformation parameters. However, since the process has already been completed at least once, it is expected that the new offset values will not deviate substantially and the difference in values will approach zero with each iteration of the process. A threshold or acceptable tolerance value, such as, for example, 0.002 inches, may be selected such that the process automatically terminates when a newly defined tool offset value is equal to or less than this predefined threshold or acceptable tolerance value.

Further details of data gathering procedures according to an example embodiment of the control system manager 60 are described with reference to FIGS. 5-10 below.

Figure 5:
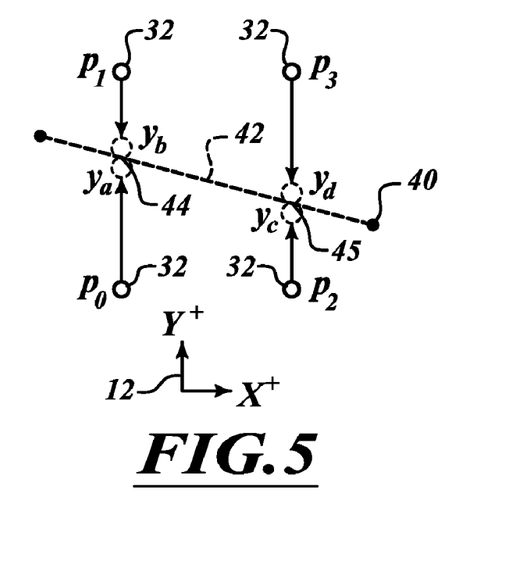
FIG. 5 is a schematic diagram showing instructed paths of a mixing tube of the 5-axis waterjet cutting machine of FIG. 2 with respect to a light beam of the sensor of FIG. 2, according to one embodiment of a method for improving a tool tip path of a waterjet cutting machine.
Figure 6:
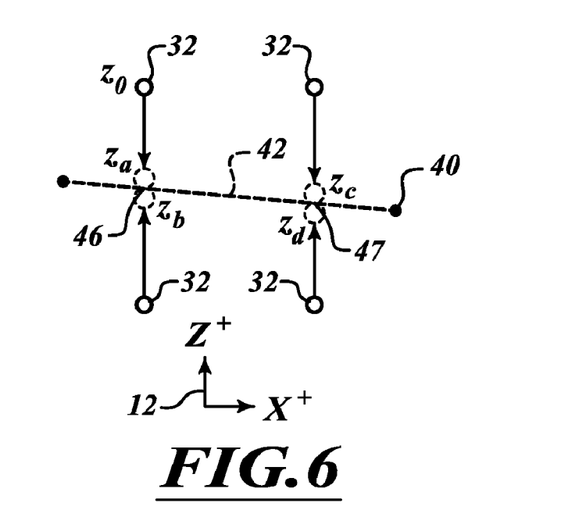
FIG. 6 is a schematic diagram showing additional instructed paths of the mixing tube with respect to the light beam.

As illustrated in FIGS. 5 and 6, a portion of the cutting head assembly 30 of the waterjet cutting machine 20 is used to initially gather positional data indicative of the position and orientation of the sensor 40 that is placed within the operable range of the machine 20. More particularly, according to the illustrated embodiment, a mixing tube 32 of the cutting head assembly 30 is moved through a series of movements to determine a position and orientation of a light beam 42 of the sensor 40 with respect to a base reference frame 12 of the machine 20. Specifically, with reference to FIG. 5, the mixing tube 32 is first orientated parallel to the z-axis Z of the base reference frame 12 and the cutting head assembly 30 is brought to an initial position $p_0$ proximate the sensor 40, such as by using a jog function of the machine 20. A program is then initiated and the cutting head assembly 30 is instructed to move in a direction parallel to the y-axis Y of the base reference frame 12 so that the mixing tube 32 of the cutting head assembly 30 interrupts the light beam 42 with a first side of the outside diameter of the mixing tube 32 at $y_a$ as the mixing tube 32 moves in the positive y-direction $Y^+$. In this manner, the mixing tube 32 is instructed to approach the light beam 42 from one side of the beam 42 to identify a first interrupt position $y_a$ within a plane parallel to the x-y plane of the base reference frame 12. Next, the cutting head assembly 30 is brought to an opposing side of the light beam 42 at $p_1$, for example, and instructed to move in a direction parallel to the y-axis Y of the base reference frame 12 so that the mixing tube interrupts the light beam 42 with a second side of the outside diameter of the mixing tube 32 at $y_b$ as the mixing tube 32 moves in the negative y-direction $Y^-$. In other words, the mixing tube 32 is instructed to approach the light beam 42 from the other side of the light beam 42 to identify a second interrupt position $y_b$ within a plane parallel to the x-y plane of the base reference frame 12. The control system manager 60 receives input data from the sensor 40 corresponding to the interrupt positions $y_a$, $y_b$ and then calculates the position of one point 44 along the light beam 42 within a plane parallel to the x-y plane of the base reference frame 12. This can be achieved by adding half of the difference between the interrupt positions $y_a$, $y_b$ to the first interrupt position $y_a$.

The mixing tube 32 is then relocated a defined distance in the positive x-direction $X^+$ with respect to the initial position $p_0$ to a position at $p_2$ and a similar cycle is repeated to gather input data corresponding to the interrupt positions labeled $y_c$, $y_d$. More particularly, from the position $p_2$, the mixing tube 32 is instructed to approach the light beam 42 from one side of the beam 42 to identify a third interrupt position $y_c$ within a plane parallel to the x-y plane of the base reference frame 12. The mixing tube 32 is then brought to a position $p_3$ on the opposing side of the light beam 42 and instructed to approach the light beam 42 from the opposing side to identify a fourth interrupt position $y_d$. With these readings the control system manager 60 calculates the position of another point 45 along the light beam 42 within a plane parallel to the x-y plane of the base reference frame 12. This can be achieved by adding half of the difference between the interrupt positions $y_c$, $y_d$ to the first interrupt position $y_c$. Then, with the information pertaining to the location of points 44 and 45, the slope or skew of the light beam 42 with respect to the x-y reference plane can be determined. The slope of the light beam 42 with respect to the x-y reference plane is retained or stored for use in defining a sensor reference frame 48 (FIGS. 7A-11), as discussed further below.

Next, with reference to FIG. 6, the mixing tube 32 is orientated parallel to the y-axis Y of the base reference frame 12 by rotating about the first rotary axis B and the cutting head assembly 30 is brought to an initial position $z_0$ proximate the sensor 40. Similar to the steps above, the cutting head assembly 30 is cycled through a series of instructed movements to obtain data corresponding to where the mixing tube 32 interrupts the light beam 42 at interrupt positions $z_a$ and $z_b$ to determine another point 46 along the light beam 42 and at interrupt positions $z_c$ and $z_d$ to determine yet another point 47 along the light beam 42. More particularly, from the initial position $z_0$ the mixing tube 32 is instructed to interrupt the light beam 42 from each of opposing sides thereof with respect to the z-axis Z to identify interrupt positions $z_a$ and $z_b$, and ultimately point 46. Then, the mixing tube 32 is relocated a selected distance in the positive x-direction $X^+$ (which may vary based on a length of the light beam 42) with respect to the initial position $z_0$ and instructed to interrupt the light beam 42 from each of opposing sides thereof with respect to the z-axis Z to identify interrupt positions $z_c$ and $z_d$, and ultimately point 47. With the information pertaining to the location of points 46 and 47, the slope or skew of the light beam 42 with respect to the x-z reference plane can be determined. Then, in conjunction with the information gathered above, an orientation vector of the light beam 42 is calculated and a beam orientation or beam reference frame 48 (FIGS. 7A-11) may be established such that all subsequent measurements can be obtained with instructed moves perpendicular to the light beam reference frame 48 and hence light beam 42. Further, by establishing the beam reference frame 48, the control system manager 60 is able to relate all future measurements taken with respect to the beam reference frame 48 to the base reference frame 12, and vice versa, by appropriate transformations.

After obtaining an initial beam orientation and establishing a beam reference frame 48, an optional beam orientation verification step may be performed to determine whether the beam reference frame 48 is known within an acceptable level of tolerance. More particularly, the mixing tube 32 may be cycled through movements similar to those described above with reference to FIGS. 5 and 6 but adjusted such that all movements are made perpendicular to the calculated beam orientation. Moving the mixing tube 32 perpendicular to the calculated beam orientation to sense the slope of the light beam 42 should ideally result in zero slope, thereby verifying the accuracy of the calculated beam orientation. However, should the results of the verification process indicate a slightly skewed light beam 42 with respect to the beam reference frame 48, the beam reference frame 48 can be adjusted accordingly such that all subsequent movements are made perpendicular to a further refined beam orientation. In this manner, the results of the verification step may confirm that the orientation of the light beam 42 is known within an accepted tolerance range or may be used to further refine the beam orientation in an iterative manner. For example, in some embodiments, the beam orientation verification process may continue in an iterative manner until the beam orientation falls within an accepted tolerance range, such as, for example, 0.02 degrees in each of the measured directions. In other embodiments, the beam verification process may be omitted.

Next, the control system manager 60 performs a series of measurement procedures to obtain information indicative of misalignment of the tool, and more particularly misalignment between the machine focal point FP and the tool center point TCP. According to some embodiments, the control system manager 60 performs at least three distinct measurement procedures to determine a misalignment with respect to tool length, side to side tool movement and tool circularity, as described in more detail below.

For example, in executing a tool length misalignment measurement procedure, the control system manager 60 moves the cutting head assembly 30 through a series of movements to interrupt the light beam 42 of the sensor 40 and obtain information indicative of a tool length or tool length offset TL (i.e., the distance parallel to the tool center line T from the focal point FP to the tool center point TCP). In the following measurements, the mixing tube orientation is adjusted perpendicular to the light beam 42 and movements of the cutting head assembly 30 are made perpendicular to the light beam 42. In other words, the cutting head assembly 30 and hence mixing tube 32 is moved perpendicularly with respect to the beam reference frame 48.

Figure 7A:
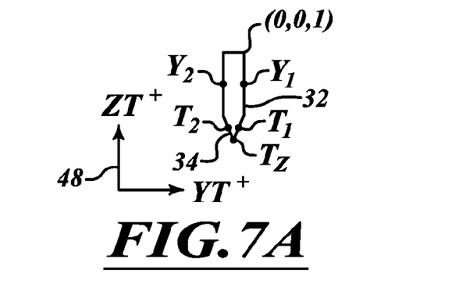
FIG. 7A is a schematic diagram illustrating the mixing tube in a vertical orientation with respect to a light beam reference frame.

In particular, with reference to FIG. 7A, the mixing tube 32 is oriented to extend parallel to the z-axis ZT of the beam reference frame 48 indicated by the vector (0,0,1) and instructed to cycle through a series of movements to gather tool positional information corresponding to the interrupt points labeled $Y_1$, $Y_2$, $T_1$, $T_2$ and $T_z$. More particularly, with reference to FIG. 7B, positional data is gathered corresponding to the interrupt points $Y_1$ and $Y_2$ by interrupting the light beam 42 with opposing sides of the outer diameter of the mixing tube 32 at interrupt positions $y_1$ and $y_2$ as the mixing tube 32 moves in the positive YT and negative YT directions, respectively. The perceived mixing tube diameter can then be determined by finding the difference between the feedback position of the machine focal point FP in each of the interrupt positions $y_1$ and $y_2$. The term "perceived mixing tube diameter" is used because it is different from the actual mixing tube diameter due to the thickness of the light beam 42. Accordingly, to determine a thickness of the light beam 42, the perceived mixing tube diameter may be subtracted from the actual mixing tube diameter. The actual mixing tube diameter may be stored in the machine based on prior measurements or may be obtained with calipers or the like and input into the system 10. The y-position of the machine focal point FP corresponding to the tool center line T aligning with the light beam 42 can be determined and stored by calculating the difference between the feedback position of the machine focal point FP in each of the interrupt positions $y_1$ and $y_2$ and adding half of this value back to the feedback position corresponding to interrupt position $y_1$.

Figure 7B:
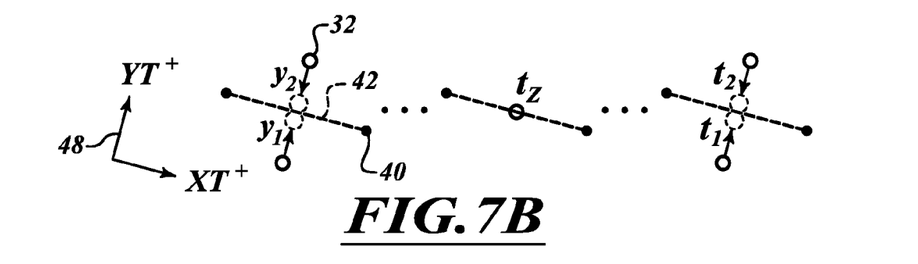
FIG. 7B is a schematic diagram showing additional instructed paths of the mixing tube with respect to the light beam with the mixing tube in the orientation illustrated in FIG. 7A.

Next, the tool center line T of the mixing tube 32 is aligned to the light beam 42 (based on the y-position calculated immediately above) and the mixing tube 32 is moved downward to interrupt position $t_z$ to interrupt the light beam 42 with a tip 34 of the mixing tube 32 at point $T_z$. The z-position corresponding to the end of tip 34 can be determined and stored by subtracting half of the light beam diameter from the feedback position corresponding to the interrupt position $t_z$. A tip diameter of the mixing tube 32 is then measured at points $T_1$ and $T_2$ by moving down with respect to the z-axis ZT of the beam reference frame 48 a defined step and interrupting the light beam 42 from opposing sides of the mixing tube 32 as the mixing tube 32 moves in the positive YT and negative YT directions to positions $t_1$ and $t_2$, respectively. The y-position of the machine focal point FP corresponding to the tool center line T near the tip 34 being aligned with the light beam 42 can then be determined and stored by calculating the difference between the feedback position of the machine focal point FP in each of the interrupt positions $t_1$ and $t_2$ and adding half of this value back to the feedback position corresponding to interrupt position $t_1$.

Figure 8A:
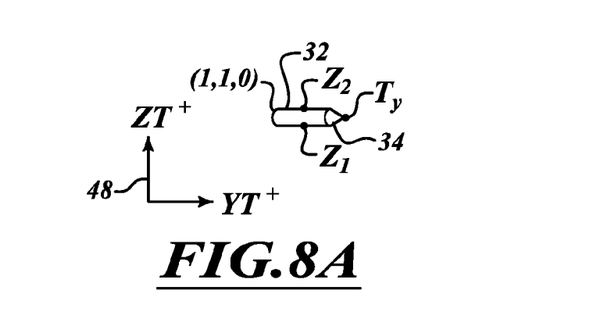
FIG. 8A is a schematic diagram illustrating the mixing tube in a horizontal orientation with respect to the light beam reference frame.
Figure 8B:
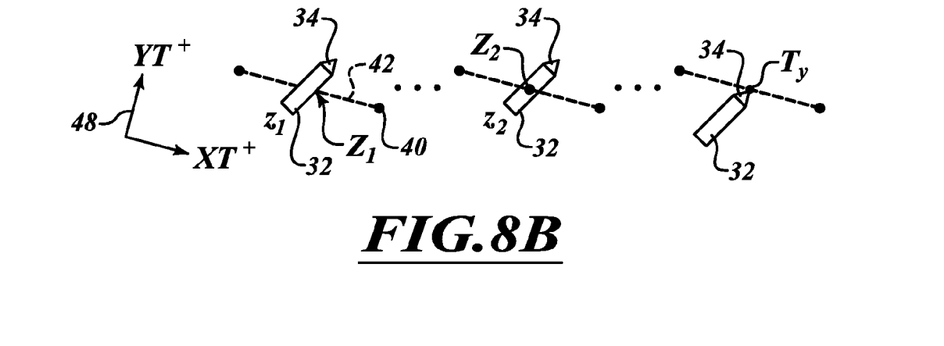
FIG. 8B is a schematic diagram showing additional instructed paths of the mixing tube with respect to the light beam with the mixing tube in the orientation illustrated in FIG. 8A.
Figure 9A:
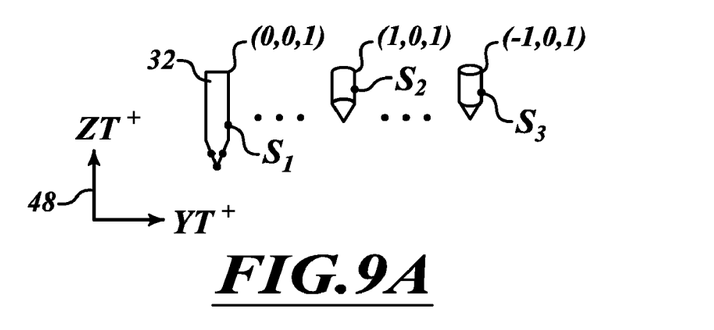
FIG. 9A is a schematic diagram illustrating the mixing tube in various orientations with respect to the light beam reference frame.
Figure 9B:
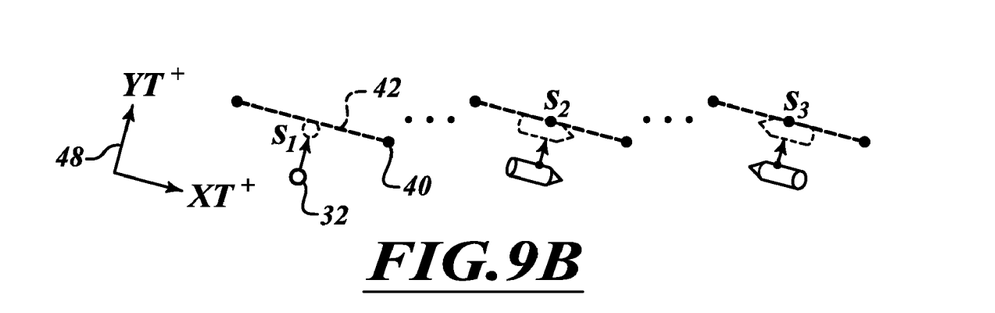
FIG. 9B is a schematic diagram showing additional instructed paths of the mixing tube with respect to the light beam with the mixing tube in the orientations illustrated in FIG. 9A.
Figure 10:
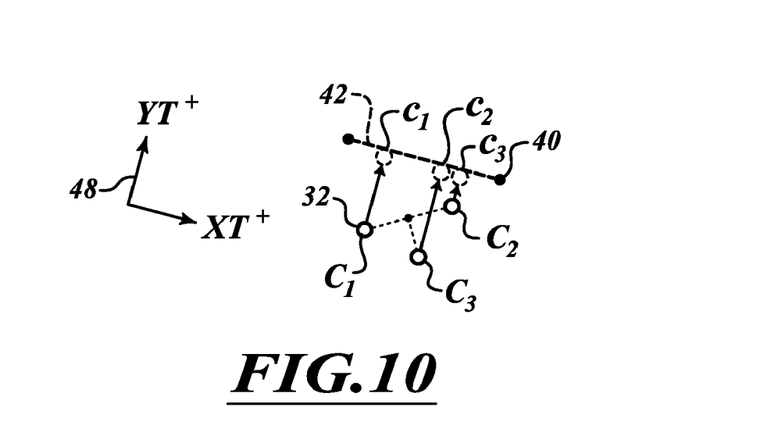
FIG. 10 is a schematic diagram showing additional instructed paths of the mixing tube with respect to the light beam with the mixing tube in a number of orientations rotated about a rotary axis.
Figure 11:
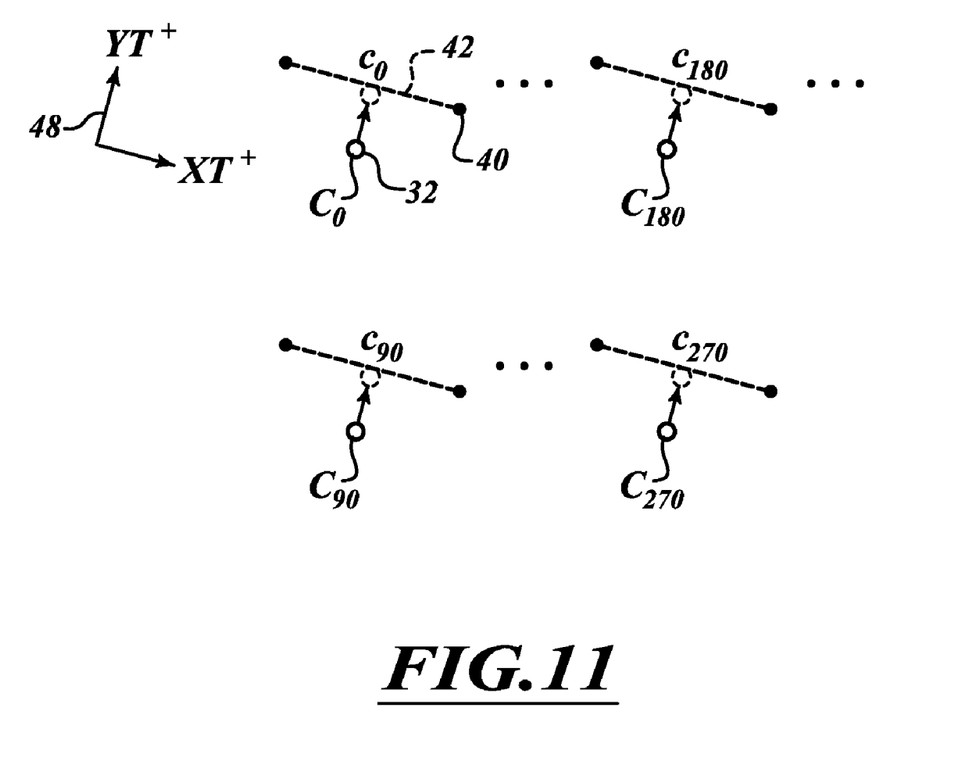
FIG. 11 is a schematic diagram showing additional instructed paths of the mixing tube with respect to the light beam with the mixing tube in a number of orientations rotated about a rotary axis.

Next, as illustrated in FIGS. 8A and 8B, the mixing tube orientation is changed to a horizontal position by rotating the first rotary axis B such that the tool center line T of the mixing tube 32 lies in a plane parallel to the XT-YT plane and points in a 45 degree angle indicated by the vector (1,1,0) to gather positional information corresponding to the points labeled $Z_1$, $Z_2$ and $T_y$. More particularly, with reference to FIG. 8B, positional data is gathered at points $Z_1$ and $Z_2$ by interrupting the light beam 42 with opposing sides of the outer diameter of the mixing tube 32 at interrupt positions $z_1$ and $z_2$ as the mixing tube 32 moves in the negative ZT and positive ZT directions, respectively. The z-position of the machine focal point FP corresponding to the tool center line T of the mixing tube 32 being aligned with the light beam 42 can then be determined and stored by calculating the difference between the feedback position of the machine focal point FP in each of the interrupt positions $z_1$ and $z_2$ and adding half of this value back to the feedback position corresponding to interrupt position $z_1$. The perceived mixing tube diameter can also be calculated and subtracted from the actual mixing tube diameter to derive the diameter of the light beam 42 with respect to the present orientation of the mixing tube 32.

Next, the tool center line T of the mixing tube 32 is aligned to the light beam 42 (based on the z-position calculated immediately above) with the mixing tube remaining horizontal and the mixing tube 32 is moved forward to interrupt position $t_y$, to interrupt the light beam 42 with the tip 34 of the mixing tube 32 at point $T_y$. After obtaining information relating to the positions and orientations described above, a tool length or tool length offset TL is calculated. More specifically, the change in y-position of the machine focal point FP is obtained between the orientations described above (i.e., vertical and horizontal) and used to derive the tool length using appropriate trigonometric functions with adjustments made for the light beam width. As previously described, the tool length or tool length offset TL corresponds to the distance parallel to the tool center line T from the machine focal point FP to the tool center point TCP. The tool length or tool length offset TL may be displayed and/or stored for subsequent use.

In executing a side to side misalignment measurement procedure, the control system manager 60 moves the cutting head assembly 30 through a series of instructed movements to obtain side to side position information corresponding to the mixing tube 32 at various orientations. More particularly, with reference to FIGS. 9A and 9B, the mixing tube 32 is oriented to extend parallel to the z-axis ZT of the beam reference frame 48 indicated by the vector (0,0,1) in a first data gathering step, extend downwards at a 45 degree angle with respect to the ZT-XT plane indicated by the vector (1,0,1) in a second gathering step, and extend downwards at a 45 degree angle with respect to the ZT-XT plane indicated by the vector (−1,0,1) in a third data gathering step. To gather positional information of the machine focal point FP corresponding to the points labeled $S_1$, $S_2$ and $S_3$, the mixing tube 32 is moved in the positive YT direction to interrupt the light beam 42 at interrupt positions $s_1$, $s_2$ and $s_3$, respectively, at the same position along the length of the mixing tube 32. Consequently, it is desirable to determine the tool length or tool length offset TL prior to executing the side to side misalignment measurement procedure. After gathering positional data of the machine focal point FP corresponding to the interrupt positions at points $s_1$, $s_2$ and $s_3$, the data is used to calculate a side to side offset value between the machine focal point FP and the tool center line T in a direction perpendicular to the tool center line T. The side to side offset can be determined by calculating the difference between the feedback position of the machine focal point FP in each of the interrupt positions $s_2$ and $s_3$ and adding half of this value back to the feedback position corresponding to interrupt position $s_2$. The side to side offset value may be displayed and/or stored for subsequent use.

In executing a circularity misalignment measurement procedure, the control system manager 60 moves the cutting head assembly 30 through a series of instructed movements to obtain circularity misalignment information of the mixing tube 32. More particularly, with reference to FIG. 10, the light beam 42 is interrupted at positions $c_1$, $c_2$ and $c_3$ by moving the mixing tube 32 in the positive YT direction for each of three mixing tube orientations $C_1$, $C_2$ and $C_3$ in which the mixing tube 32 is oriented vertically and rotated about the second rotary axis C to varying degrees. For example, the $C_1$ orientation corresponds to an initial 45 degree rotation from the home position of the second rotary axis C, the $C_2$ orientation corresponds to a 180 degree rotation of the second rotary axis C from the $C_1$ orientation, and the $C_3$ orientation corresponds to a 90 degree rotation of the second rotary axis C from the $C_1$ orientation. After gathering positional data of the machine focal point FP corresponding to the interrupt positions at positions $c_1$, $c_2$ and $c_3$, the data is used to calculate circularity offset values corresponding to x-position and y-position offsets between the second rotary axis C and the tool center line T when the mixing tube 32 is oriented vertically. For example, the y-position offset value can be can be determined by calculating the difference between the feedback position of the machine focal point FP in each of the interrupt positions $c_1$ and $c_2$ and adding half of this value back to the feedback position corresponding to interrupt position $c_1$. The y-position offset value may then be applied to compensate circularity in the y-direction and/or it may be displayed or stored for subsequent use. The x-position offset value can be determined by calculating the distance from the feedback position corresponding to position $c_3$ to a compensated $c_1$ or $c_2$ position and the feedback position corresponding to position $c_2$. The x-position offset value may likewise be displayed and/or stored for subsequent use.

With the gathered positional information reflected in the tool offset values described above, transformation parameters (e.g., Denavit-Hartenberg parameters) may be calculated via inverse kinematic equations. These transformation parameters may then in turn be applied to more accurately define the kinematic setup of the machine 20. More particularly, using the gathered positional information discussed above, the control system manager 60 can calculate a more precise kinematic model by relating the sensed positions and orientations of the tool center point TCP relative to the machine focal point FP (reflected in the tool offset values) back to the Cartesian coordinate system defined by the base reference frame 12 through intermediate sensor reference frame 48. In particular, inverse kinematic equations can be applied to derive or calculate transformation parameters (e.g., Denavit-Hartenberg parameters) that define the kinematic setup that would result in the mixing tube 32 producing the readings sensed in the data gathering steps. Differences between these newly derived transformation parameters with those defining the initial kinematic setup (which are dictated by design) may be referred to as transformation offset values. The transformation parameters and/or transformation offset values may be displayed or stored for subsequent use.

The tool offset values and derived transformation parameters are indicative of and compensate for an error between positional data of the tool center point TCP relative to the machine focal point FP (or a tool center line T passing through the tool center point TCP and a tool vector passing through the machine focal point FP). The newly derived transformation parameters describe the kinematic setup of the machine 20 and enable improved accuracy of a desired tool tip path irrespective of misalignment of the tool from an ideal machine configuration. In this manner, manual testing and physical adjustments to align the tool center line T or tool center point TCP with a machine focal point FP, for example, is unnecessary. Rather, a user can simply jog the cutting head assembly 30 near the sensor 40 and activate the control system manager 60 and the machine 20 will test and compensate for errors in misalignment of the tool center point TCP and focal point FP of the machine 20 with little to no further manual intervention from the user.

In some embodiments, after obtaining an initial set of transformation parameters, an optional verification process may be performed. For example, the measurements outlined above with reference to FIGS. 5-10 may be repeated one or more times with a previously derived set of transformation parameters activated to verify that any newly obtained positional data based on a kinematic setup defined by the transformation parameters falls within an acceptable level of tolerance. If newly obtained transformation parameters are not within an acceptable tolerance, then the verification process can be repeated with the newly obtained transformation parameters activated to iteratively refine the kinematic setup of the machine 20. The verification process may continue in such an iterative manner until the transformation parameters define the kinematic setup within an acceptable tolerance range.

Additional testing may also be performed prior to processing a workpiece to verify the current adjustment or compensation of the tool center point TCP is within tolerance. For example, the mixing tube 32 may be oriented vertically and instructed through a series of movements to measure circularity alignment of the mixing tube 32 according to the newly defined kinematic setup. More particularly, with reference to FIG. 11, the light beam 42 may be interrupted at positions $c_0$, $c_{180}$, $c_{90}$, and $c_{270}$ by rotating the mixing tube 32 through each of four mixing tube orientations $C_0$, $C_{180}$, $C_{90}$ and $C_{270}$ in which the mixing tube 32 is rotated about the second rotary axis C to a different degree prior to interrupting the light beam 42. The $C_0$ orientation corresponds to an initial 0 degree rotation or home position of the second rotary axis C, the $C_{180}$ orientation corresponds to a 180 degree rotation of the second rotary axis C, the $C_{90}$ orientation corresponds to a 90 degree rotation of the second rotary axis C and the $C_{270}$ orientation corresponds to a 270 degree rotation of the second rotary axis C. If the measurements obtained at each orientation are within an acceptable tolerance range (e.g., ±0.005 inches), then the testing process may end and workpiece processing may commence.

As another example of additional testing, measurements of side to side alignment may be taken as illustrated in FIGS. 7A and 7B and evaluated against a defined tolerance range to test the accuracy of the newly defined kinematic setup. Again, if measurements obtained at each orientation are within an acceptable tolerance range (e.g., ±0.005 inches) then the testing process may end and workpiece processing may commence.

According to various embodiments, once an acceptable level of accuracy is obtained, the control system manager 60 commences a workpiece processing mode in which the control system manager 60 moves the cutting head assembly 30 along a tool tip path derived from a desired finished workpiece profile or structure and as modified using the tool testing and alignment systems and methods described herein. In particular, the kinematic setup of the machine 20 may be refined per the newly derived transformation parameters and combined with computer-aided manufacturing (CAM) techniques involving the importation of CAD model geometry to generate the improved tool tip path. In this manner, the control system manager 60 enables the processing of workpieces in a particularly precise and efficient manner.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for improving a tool tip path of a waterjet cutting machine, comprising:
   sequencing a cutting head assembly coupled to the waterjet cutting machine through a first sequence of positions and orientations relative to a base reference frame;
   receiving information indicative of the position and orientation of a sensor with respect to the base reference frame;
   sequencing a cutting head assembly coupled to the waterjet cutting machine through a second sequence of positions and orientations relative to the position and orientation of the sensor;
   sensing a location of the cutting head assembly at each position and orientation of the second sequence of positions and orientations with the sensor to obtain information indicative of the second sequence of positions and orientations; and
   generating an improved tool tip path based at least in part on transformation parameters calculated from the information indicative of second sequence of positions and orientations.

2. The method of claim 1 wherein sensing a location of the cutting head assembly at each position and orientation of the second sequence of positions and orientations with a sensor includes sensing a portion of the cutting head assembly.

3. The method of claim 1 wherein sensing a location of the cutting head assembly at each position and orientation of the second sequence of positions and orientations with a sensor includes sensing a mixing tube of the cutting head assembly.

4. The method of claim 1 wherein sensing a location of the cutting head assembly at each position and orientation of the second sequence of positions and orientations with a sensor includes sensing a waterjet of the cutting head assembly.

5. The method of claim 1 wherein sensing a location of the cutting head assembly at each position and orientation of the second sequence of positions and orientations with a sensor includes sensing a pin received in a bore of a mixing tube of the cutting head assembly.

6. The method of claim 1 wherein sensing a location of the cutting head assembly at each position and orientation of the second sequence of positions and orientations with a sensor includes interrupting a light beam of a photoelectric sensor.

7. A method for a computing system to improve a tool tip path of a waterjet cutting machine, comprising:
- under the control of one or more configured computing systems,
- providing instructions to move a cutting head assembly coupled to the waterjet cutting machine through a first plurality of positions and orientations;
- calculating a reference frame of a sensor based at least in part on information indicative of the first plurality of positions and orientations;
- providing instructions to move the cutting head assembly coupled to the waterjet cutting machine through a second plurality of positions and orientations relative to the reference frame of the sensor;
- receiving information indicative of the second plurality of positions and orientations of a portion of the cutting head assembly from the sensor, the sensor configured to sense the portion of the cutting head assembly as the cutting head assembly moves through the second plurality of positions and orientations proximate the sensor; and
- providing instructions to move a tool center point of the cutting head assembly along an improved tool tip path derived at least in part from the information indicative of the second plurality of positions and orientations of the portion of the cutting head assembly.

8. The method of claim 7, further comprising:
- calculating transformation parameters based at least in part on the information indicative of the second plurality of positions and orientations of the portion of the cutting head assembly, and wherein the improved tool tip path is derived at least in part from the transformation parameters.

9. The method of claim 8 wherein the transformation parameters are indicative of at least a misalignment of a machine focal point and a tool center line of the cutting head assembly.

10. The method of claim 7 wherein receiving information indicative of the second plurality of positions and orientations of a portion of the cutting head assembly includes receiving information indicative of the second plurality of positions and orientations of a mixing tube of the cutting head assembly.

11. The method of claim 7 wherein the sensor is a photoelectric sensor.

12. The method of claim 7 wherein providing instructions to move a cutting head assembly coupled to the waterjet cutting machine through a second plurality of positions and orientations relative to the reference frame of the sensor includes providing instructions to move the cutting head assembly through the second plurality of positions and orientations perpendicularly with respect to the reference frame of the sensor.

13. The method of claim 7 wherein providing instructions to move the cutting head assembly through a first plurality of positions and orientations includes providing instructions to move the cutting head assembly in a series of movements with the cutting head assembly in a vertical orientation with respect to a base reference frame to trigger the sensor in at least two positions and providing instructions to move the cutting head assembly in a series of movements with the cutting head assembly in a horizontal orientation with respect to the base reference frame to trigger the sensor in at least two other positions.

14. A method for a computing system to improve a tool tip path of a multi-axis machine, comprising:
- under the control of one or more configured computing systems,
- providing instructions to move a tool coupled to the multi-axis machine through a first set of positions and orientations proximate a sensor;
- receiving information indicative of the position and orientation of the sensor as the tool moves through the first set of positions and orientations to determine a sensor reference frame;
- providing instructions to move the tool through a second set of positions and orientations proximate the sensor and relative to the sensor reference frame;
- receiving information indicative of the second set of positions and orientations of the tool from the sensor;
- calculating transformation parameters based at least in part on the information indicative of the second set of positions and orientations of the tool; and
- providing instructions to move the tool along an improved tool tip path derived at least in part from the transformation parameters.

15. The method of claim 14 wherein providing instructions to move the tool through a first set of positions and orientations includes providing instructions to move the tool in a series of movements with the tool in a vertical orientation with respect to a base reference frame to trigger the sensor in at least two positions of the first set of positions and orientations and providing instructions to move the tool in a series of movements with the tool in a horizontal orientation with respect to the base reference frame to trigger the sensor in at least two other positions of the first set of positions and orientations.

16. The method of claim 14 wherein the multi-axis machine is a 5-axis waterjet cutting machine having three translational axes and two non-parallel rotary axes that converge to form a machine focal point, and wherein calculating transformation parameters based at least in part on the information indicative of the second set of positions and orientations of the tool includes calculating transformation parameters which compensate for at least a misalignment between a tool vector passing through the machine focal point and a tool center line of the tool.

17. The method of claim 1 wherein receiving information indicative of the position and orientation of the sensor with respect to the base reference frame includes receiving information indicative of the position and orientation of the sensor with the sensor statically fixed within an operable range of the waterjet cutting machine.

18. The method of claim 7 wherein calculating the reference frame of the sensor based at least in part on information indicative of the first plurality of positions and orientations of the cutting head assembly includes calculating the reference frame of the sensor with the sensor statically fixed within an operable range of the waterjet cutting machine.

19. The method of claim 14 wherein providing instructions to move the tool coupled to the multi-axis machine through the first set of positions and orientations proximate the sensor includes providing instructions to move the tool coupled to the multi-axis machine through the first set of positions and orientations proximate the sensor with the sensor statically fixed within an operable range of the multi-axis machine.

* * * * *